United States Patent

Daudt, Jr.

[15] 3,686,936
[45] Aug. 29, 1972

[54] METHOD AND APPARATUS FOR DETECTING STALL BUFFET

[72] Inventor: Charles H. Daudt, Jr., P.O. Box 511, Ridgefield, Conn. 06877

[22] Filed: Feb. 11, 1970

[21] Appl. No.: 10,407

Related U.S. Application Data

[63] Continuation-in-part of Ser. No. 567,129, Jan. 22, 1966, Pat. No. 3,507,246.

[52] U.S. Cl. .................... 73/180, 73/178 R, 73/181
[51] Int. Cl. ........................................... G01c 23/00
[58] Field of Search......... 73/178 R, 178 T, 180, 182, 73/181; 116/129

[56] References Cited

UNITED STATES PATENTS 3,040,567  6/1962  Brody .......................73/178 R
3,188,861  6/1965  Miller........................73/178 T Primary Examiner—Donald O. Woodiel
Attorney—Robertson, Bryan, Parmelee & Johnson

[57] ABSTRACT

An aircraft instrument has been designed to indicate impending stall buffet. An angle of attack indicator is provided with a dial having two scales, one displaying angles of attack and the other displaying the maximum Mach number that may be flown for each angle of attack. A Mach number indicator is associated with the Mach scale to display the aircraft's operating Mach number. Stall buffet is indicated when the values of the maximum Mach number and the operating Mach number converge on one another. Additionally, the present instrument will also indicate the maximum angle of attack that can be flown for each operating Mach number. Stall buffet will be indicated when the values of the operating and maximum angle of attack converge. Separate warning means and aircraft control actuators can be provided so as to indicate impending stall buffet and to control the aircraft so as to remove it from approaching stall buffet.

8 Claims, 5 Drawing Figures

INVENTOR
CHARLES H. DAUDT
BY Robertson, Bryan,
Parmelee & Johnson.
ATTORNEYS

INVENTOR
CHARLES H. DAUDT
BY Robertson, Bryan,
Parmelee & Johnson.
ATTORNEYS

PATENTED AUG 29 1972 3,686,936

INVENTOR
CHARLES H. DAUDT
BY Robertson, Bryan,
Parmelee & Johnson.
ATTORNEYS

METHOD AND APPARATUS FOR DETECTING STALL BUFFET

BACKGROUND

The present invention is a continuation in part of application, Ser. No. 567,129 filed Jan. 22, 1966, now Pat. No. 3,507,246.

The present invention relates to an aircraft instrument and instrument dial and, in particular, to an aircraft instrument with two scales; one indicating angles of attack and the other indicating corresponding maximum Mach number for each angle of attack.

There have been a number of airplane accidents caused in part by the airlines philosophy of using indicated airspeed instrumentation to avoid stall or stall buffeting conditions, that is the shaking of the aircraft's flying surface controls and sometimes the whole aircraft just prior to stall. Using indicated airspeed, pilots operate their aircraft at a theoretically predetermined airspeed which incorporates for safety an airspeed margin above stall buffet. This safety margin has been heretofore unknown by the pilot.

Indicated airspeed, however, does not take into consideration a number of factors which either by themselves or in combination with one another can combine to create stall buffeting conditions. Some of these factors are the aircraft's weight, bank angle, pitch angle, the pilot's overcontrolling, air turbulence, "G" forces and Mach number. Additionally indicated airspeed may not fully take into account all of the various maneuvers that a pilot may have been forced to make while flying his aircraft.

The problem is further complicated when the aircraft operates at higher altitudes, i.e., 30,000 feet and above, because at these high altitudes the indicated airspeed margins decreases. The increased criticalness of the higher altitude operation has heretofore been unrealistically compensated for by providing the pilot with flight manual, charts and graphs whereby he may obtain at a given instant the theoretical indicated airspeed to avoid stall buffeting conditions. The above procedures have proven to be both inaccurate and impractical in that the pilot must estimate the "G" force on the plane at the particular instant in question for him to select the proper graph. Even if a "G" meter were to be installed in the aircraft, the above method is impractical in that the proper graph cannot be entered and the problem solved fast enough to satisfy the changing flying conditions.

As a consequence of the above, pilots operating jet aircraft at high altitudes, hopefully at the safe indicated airspeed have sometimes lost control of their aircraft when, in the midst of a maneuver, such as varing pitch and bank angles in storm turbulence, the aircraft would unexpectedly enter stall buffet. While some aircraft recovered from the stall, some suffered severe structural damages such as losing an engine pod and some were even lost.

The airlines today generally recommend that their aircraft be operated at 30,000 feet and below when transversing areas of suspected severe turbulence because at these altitudes the safe operating range is greater and the pilot is less apt to lose control of his aircraft as a result of stall buffet. Operating at such altitudes, however, has its disadvantages in that there is more of a chance of penetrating severe air turbulence with a corresponding increase in the probability of airframe structural damage and of course passenger discomfort. The instrument of the present invention will allow an aircraft to safely operate well above 30,000 feet by providing the pilot with instrumentation that will indicate impending stall buffet.

It has been found that the point at which stall buffeting will begin can be expressed by a relationship between two factors; angle of attack and Mach number.

SUMMARY OF INVENTION

An angle of attack indicator has been utilized to express the relationship between Mach number and angle of attack. By calibrating the angle of attack meter to read maximum Mach number, it is possible for the pilot operating his airplane to, at a glance, determine for his particular angle of attack, the maximum Mach number under which he must operate his plane. The relationship of angle of attack to maximum Mach number is determined empirically for each particular type of aircraft by operating the aircraft at a specified Mach number and increasing the angle of attack until the plane is in stall buffet. This operation is repeated for various Mach numbers. The values which are thus obtained are thereafter used to calibrate the angle of attack indicator by displaying the Mach number, at which stall buffeting will begin, adjacent to its corresponding angle of attack.

A Mach number indicator may be incorporated into the instrument so as to display the aircraft's operating Mach number. This provides the pilot of the aircraft with the additional advantage of being able to see visually on one instrument the difference between the Mach number at which stall buffeting will begin and his actual operating Mach number. By coupling a properly programmed computer to the instrument, this difference may be utilized to operate a warning indicator to indicate impending stall buffet or to operate aircraft controls so as to prevent the aircraft from approaching stall buffet.

DESCRIPTION OF THE DRAWING

The accompanying drawings forming a part of this specification illustrate several embodiments of the invention.

DETAILED DESCRIPTION OF THE INVENTION

The present invention relates to the novel dial structure which is used in conjunction with an angle of attack indicator so as to provide at each angle of attack an indication of the Mach number above which an aircraft should not be operated. Stall buffet is caused by a combination of factors, some of which are the angle of bank of the aircraft, the angle of pitch of the aircraft, the weight of the aircraft, the extent of turbulence being met in the surrounding air, the extent of overcontrolling by the pilot and the value of the Mach number. Of the above factors and the various permutations which exist amongst them, the conditions that combine to cause stall buffet have been reduced to an interrelationship between two factors: (1) angle of attack, and (2) Mach number. The interrelationship of these two factors is expressed in FIG. 1.

Figure 1:
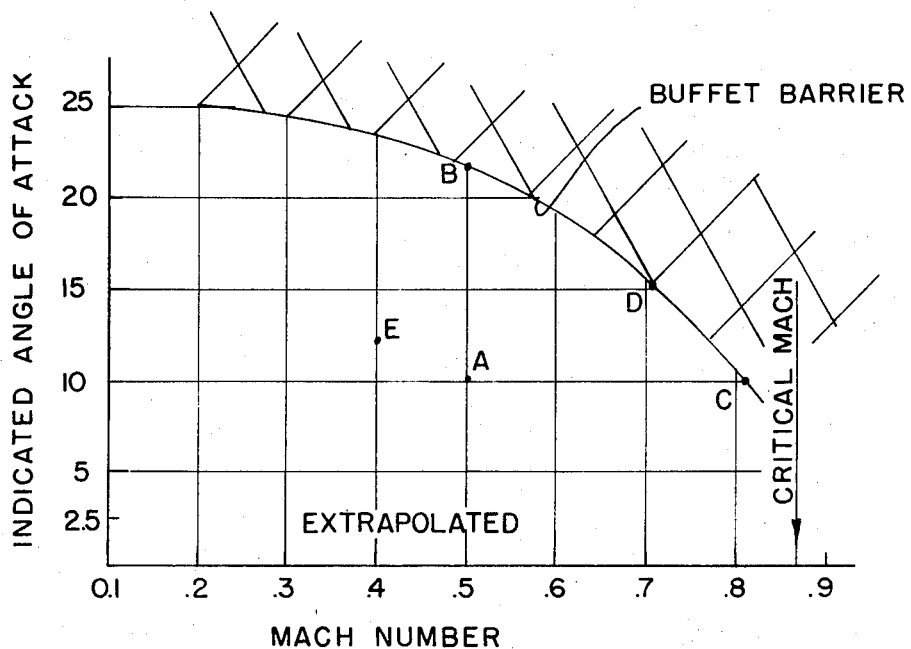
FIG. 1 is a graph of angle of attack versus Mach number showing the buffet barrier.

FIG. 1 shows a flight test calibration curve for a swept wing aircraft and is a reasonable representation of the angle of attack — Mach number curve for various aircraft of this general type. The curve defines the limiting Mach numbers which can be attained without buffet for the various angles of attack as indicated. For each given angle of attack, as can be seen, there exists a Mach number at which stall buffeting is initiated. The shaded region, above the buffet barrier, represents the stall buffet zone.

Assuming a cruising configuration of 10° angle of attack and 0.5 Mach (Position A in FIG. 1), the pilot can enter stall buffet in either of three ways; he could increase his angle of attack to approximately 22° and maintain his mach number (Point B in FIG. 1), he could increase his Mach number to approximately 0.81 and maintain his angle of attack (Point C in FIG. 1) or he could by both increasing his angle of attack and Mach number enter stall buffet, e.g., Point D in FIG. 1. Once past the buffet barrier he would be in stall buffet and would thereafter lose control of his aircraft.

Figure 2:
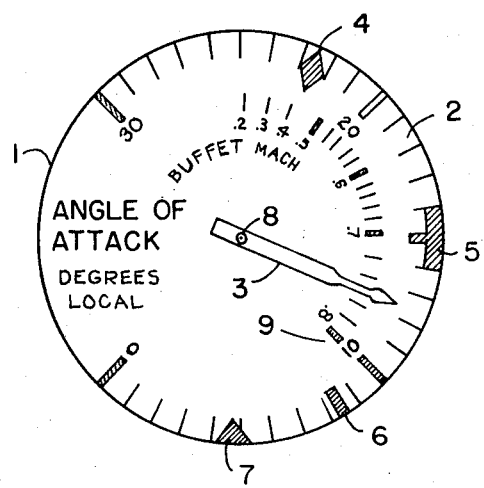
FIG. 2 is the face view of the instrument showing an associated angle of attack pointer.

From FIG. 1 it is apparent that for each Mach number there exists an angle of attack below which a plane must fly in order to avoid stall buffet (the area below the buffet barrier). An angle of attack indicator has been utilized to express this relationship by displaying the related Mach number adjacent to the angle of attack at which stall buffet takes place. FIG. 2 discloses an angle of attack indicator modified so as to read maximum Mach number. The dial 1 has an angle of attack scale 2 arcuately arranged as shown. This type scale has been widely used in angle of attack indicating instruments. The pointer 3 is attached to the shaft 8 of the instrument and indicates relative to scale 2 angle of attack. This dial has been made rotatable through a limited angle about its axis, in some cases, so that the reference marks may be adjusted to conform to special conditions which may include design feature of the aircraft carrying the instrument. The pointer is made narrower adjacent to the buffet Mach scale so that this scale can be read accurately.

The mark 4 indicates the low speed buffet index for landing configuration. The mark 5 is the approach index establishing the reference for the angle of attack pointer during landing approach at the optimum angle of attack. Marks 6 and 7 may be used for other key angles of attack indexes such as for maximum lift to drag ratio when the aircraft is in the enroute or clean configuration, for maximum endurance and for one or two engine inoperative enroute or clean configuration climbout.

The Mach number scale 9 labeled "Buffet Mach" is arcuately disposed with respect to the axis of the instrument pointer shaft 8 but at less a radius than the angle of attack scale. It will be noted that the Mach number values increase as the angle of attack values on scale 2 decrease. This is true, of course, since the higher speed, higher Mach number and resulting more separation, the less is the permissible angle of attack in order to avoid stall buffet.

By thus calibrating angle of attack meter to read related Mach number opposite the angle of attack at which stall buffet will occur, it is possible for the pilot operating the airplane to, at a glance, determine for his particular operating Mach number the angle of attack at which stall buffet will occur and under which he must operate his plane. Conversely, the pilot will also know for the angle of attack at which his plane is operating, the Mach number at which stall buffet will occur. By having two scales which are read with relation to one pointer, the situation of the aircraft with respect to angle of attack and limiting Mach number can be read rapidly and reliably. This critical relationship cannot be estimated by reference to instruments conventionally provided for the pilot.

Figure 3:
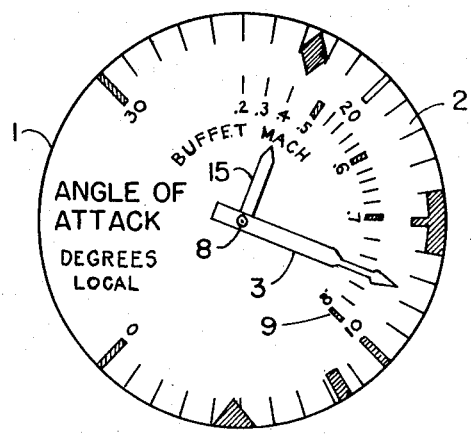
FIG. 3 is a face view of the aircraft instrument of FIG. 2 incorporating a Mach member pointer.

The instrumentation of FIG. 2 may be improved by including an indicator for displaying operating Mach number. This embodiment is shown in FIG. 3. The pilot may, therefore, without the necessity of referring to a separate Mach meter instrument, determine for his particular angle of attack and Mach number the proximity of stall buffet. More particularly as seen in FIG. 3, the instrument of FIG. 2 has been modified by including pointer 15 for displaying operating Mach number.

Scale 2 in this embodiment serves two purposes:
1. Pointer 3 in conjunction with scale 2 indicates the angle of attack at which the aircraft is operating; and
2. Scale 2 is correlated and adjacent to the Mach number scale 9 so as to indicate the maximum angle of attack at which the aircraft may fly for that Mach number.

Scale 9 in this embodiment also serves two purposes:
1. Pointer 15 in conjunction with scale 9 indicates the Mach number at which the aircraft is actually operating; and
2. Scale 9 is correlated and adjacent to the angle of attack scale 2 so as to indicate the maximum Mach number that the aircraft may fly for that angle of attack.

In the particular instance shown in FIG. 3, the aircraft is operating with an angle of attack of approximately 12.5° and 0.4 Mach number. With relation to the graph of FIG. 1, it is operating at Point E.

The instrument shown in FIG. 3 provides a visual representation of the margin that the pilot is operating below stall buffet. The pilot can therefore by properly using the instrument avoid stall buffeting conditions. To determine impending stall buffet the pilot first establishes the Mach number at which the aircraft will enter stall buffet for the angle of attack at which it is operating and also the aircrafts operating Mach number. These two values of Mach are compared and the difference between the two determined. If this difference is less than a predetermined amount, e.g. 0.05 Mach, the pilot will know that he is approaching stall buffet and will undertake the proper corrective measures to prevent the aircraft from entering into a buffeting condition. The process of determining the difference between the two Mach numbers is displayed visually by the instrument of FIG. 3. As the pointers converge on one another the aircraft is approaching the buffet barrier.

Each pointer 3 and 15 indicates or represents two separate values. Pointer 3 represents both the aircrafts operating angle of attack (displayed on scale 2) and the maximum Mach number for that angle of attack (displayed on scale 9). Likewise pointer 15 represents both the aircrafts operating Mach number (displayed on scale 9) and the maximum angle of attack (displayed on scale 2). The difference between either the operating Mach number and maximum Mach number or the difference between the operating angle of attack and the maximum angle of attack may be utilized to indicate impending stall buffet, These differences are used herein interchangeably.

Figure 4:
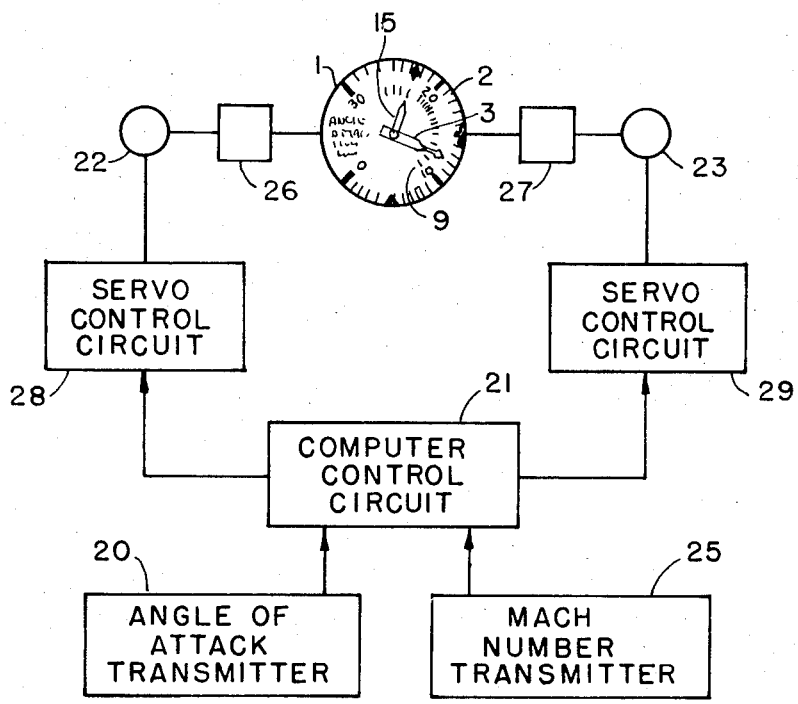
FIG. 4 is a schematic view of the system associated with the instrument of FIG. 3.

The system associated with the instrument of FIG. 3, is shown in FIG. 4. Angle of attack transmitter 20 is coupled to computer control circuit 21 which in turn generates a control signal to the servo control circuit 28 to control the operation of drive motor 22. Motor 22 moves the pointer 3 on the angle of attack scale 2 through gear train 26. On the Mach meter side, the Mach number transmitter 25 is also coupled to the computer control circuit 21 which in turn generates a control signal to the servo control circuit 29 to control the operation of drive motor 23. Pointer 15 on Mach number scale 9 is driven through gear train 27 which is coupled to motor 23.

In operation, angle of attack transmitter 20 and Mach number transmitter 25 measure respectively the angle of attack and Mach number at which the aircraft is operating and transmit a signal proportional to the measured values to the computer control circuit 21. The computer control circuit 21 upon receiving a signal from the angle of attack transmitter 20 energizes servo control circuit 28 and motor 22 to drive pointer 3 through gear train 26 to its appropriate position, on the angle of attack scale 2. Likewise, when the computer control circuit 21 receives a signal from Mach number transmitter 25 it energizes servo control circuit 29 and motor 23 to drive pointer 15 through gear train 27 to its appropriate position on the Mach number scale 9. Computer control circuit 21 is adapted to move pointer 3 over the nonlinear Mach number scale 9.

Figure 5:
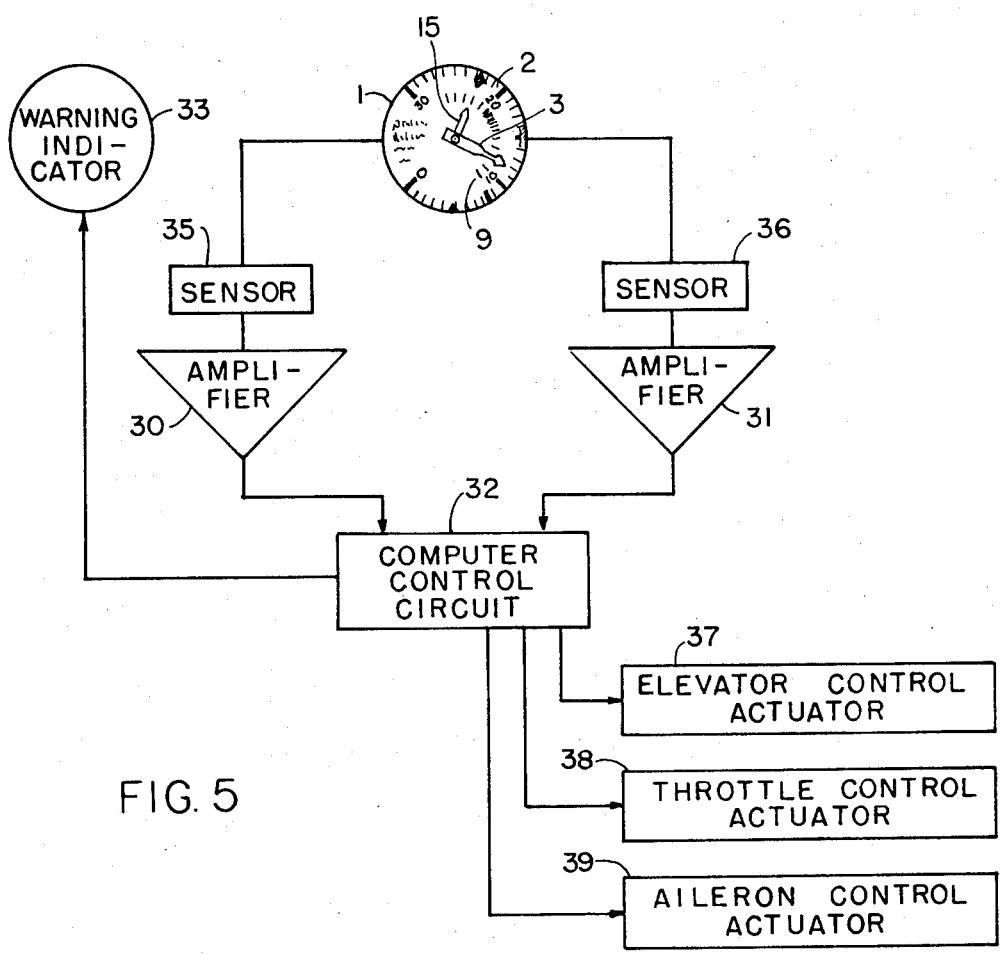
FIG. 5 is a schematic of the instrument of FIG. 3 with a warning indicator and control actuators.

The present apparatus can be adapted as shown in FIG. 5 to generate warning and actuator signals. The apparatus again consists of an indicator such as in FIGS. 3 and 4, pointer 3 indicates both angle of attack and the corresponding maximum Mach number for that angle of attack. Pointer 15 indicates the plane's operating Mach number as well as the corresponding maximum angle of attack for that Mach number. The operating angle of attack and its corresponding maximum Mach number are sensed by sensor circuitry 35, amplified by amplifier 30 and transmitted to computer control circuit 32. The operating Mach number and its corresponding maximum angle of attack are sensed by sensor circuit 36, amplified by amplifier 31 and transmitted to computer control circuit 32. Computer control circuit 32 is adapted to receive the signals generated from both sensors, compare the two, determine the difference between the two, and generate a third signal which is proportional to the difference thereof. Computer control circuit 32 is of the type which is known to persons skilled in computer art.

For warning purposes, the signal generated by the computer control circuit 32 may be utilized to operate a warning indicator 33. Warning indicator 33 may be a warning light, buzzer or even a volt meter calibrated, for example, with a scale from 0 to 10. As the voltage approached zero, the pilot would know that the difference between maximum and operating Mach number was becoming small and that stall buffet was impending. Furthermore, the warning signal could be activated at some pre-determined minimum difference before the operating Mach number equaled the maximum Mach number. For example, the warning signal could be activated whenever the operating Mach number was 0.05 Mach or less below the maximum Mach value for that angle of attack.

For control actuator purposes, the signal generated by the computer control circuit 32 may be further utilized by the computer control circuit to actuate the control actuators 37, 38 and 39. Control actuators 37, 38 and 39. Control respectively, the operation of the aircraft's elevator, throttle and ailerons. When the difference between the operating and maximum values approaches a preselected value then the computer control circuit would select the proper actuator or combination of actuators that will safely and efficiently remove the aircraft from approaching stall buffet.

For example, the computer control circuit 32 could determine that an aircraft in a bank and operating at a relatively high Mach number was approaching stall buffet which was caused by an increase in Mach number due to an updraft. The control circuit computer 32 would then selectively send a signal to the throttle actuators to reduce power thereby reducing the aircrafts Mach number. In another example, the computer control circuit 32 could determine that an aircraft in a climbing turn and operating at a relatively low Mach number was approaching stall buffet due to an increase in the aircraft's angle of attack caused by the aircraft's entry into a climbing turn. The computer control circuit 32 would then selectively send a signal to the aileron actuators to level the wings (zero bank angle), send a signal to the throttle actuators to increase power to decrease the angle of attack and send a signal to the elevator actuators to hold the decreasing angle of attack caused by the throttle action to increase power.

I claim:

1. An aircraft instrument for indicating impending stall buffet, said instrument including:
   a. an angle of attack indicator with a scale calibrated in degrees of angle of attack and with a pointer associated with said angle of attack scale so as to display the plane's angle of attack;
   b. a Mach number scale adjacent and related to the angle of attack scale so as to represent for the corresponding angle of attack the Mach number at which stall buffeting will begin; and
   c. a Mach meter pointer associated with said Mach number scale to display the value of the Mach number of the aircraft thereon.

2. The aircraft instrument of claim 1 further including:
   d. a control circuit to sense the difference between the Mach number at which stall buffeting will be initiated and the aircraft's operating Mach number and to generate a control signal proportional to the difference between the two Mach numbers; and e. a warning indicator responsive to the control signal.

3. The aircraft instrument as claimed in claim 2 wherein the warning indicator is calibrated to visually display the difference between the aircraft's operating Mach number and the Mach number at which stall buffeting will begin.

4. Apparatus for indicating impending stall buffet comprising:
   a. A dial with one scale calibrated in degrees of angle of attack and a second scale adjacent to the first scale calibrated so as to display the maximum Mach number for that attack before which stall buffeting is initiated;
   b. an angle of attack indicator in conjunction with the said dial whereby both the angle of attack and the corresponding maximum Mach number for that angle of attack are displayed; and
   c. a Mach number indicator arranged in conjunction with said dial so as to display both the Mach number at which the aircraft is operating and the corresponding maximum angle of attack for that Mach number.

5. Apparatus of claim 4 further including:
   d. control circuit to sense the difference between the maximum and operating Mach number and to generate a signal proportional to this difference; and
   e. warning means responsive to the said generated signal to display this difference.

6. An aircraft instrument for indicating impending stall buffet, said instrument including:
   a. Mach meter with a scale calibrated in Mach numbers and with a pointer associated with said Mach number scale so as to display the aircraft's operating Mach number;
   b. An angle of attack scale adjacent and related to the Mach number scale so as to represent opposite the aircraft's operating the corresponding angle of attack at which stall buffeting will occur; and
   c. a angle of attack indicator associated with said angle of attack scale to display the value of the angle of attack at which the aircraft is operating.

7. The aircraft instrument of claim 6 further including:
   d. a control circuit to sense the difference between the angle of attack at which stall buffet will occur and the aircraft's operating angle of attack and to generate a control signal that is proportional to the difference between the two angles of attack; and
   e. a warning indicator responsive to the signal generated by the control circuit.

8. The aircraft instrument of claim 7 wherein the warning indicator visually displays the difference between the aircraft's operating angle of attack and the angle of attack at which stall buffeting occurs.

* * * * *